No. 874,563. PATENTED DEC. 24, 1907.
A. BOULANGER.
POWER TRANSMISSION DEVICE.
APPLICATION FILED MAR. 26, 1906.
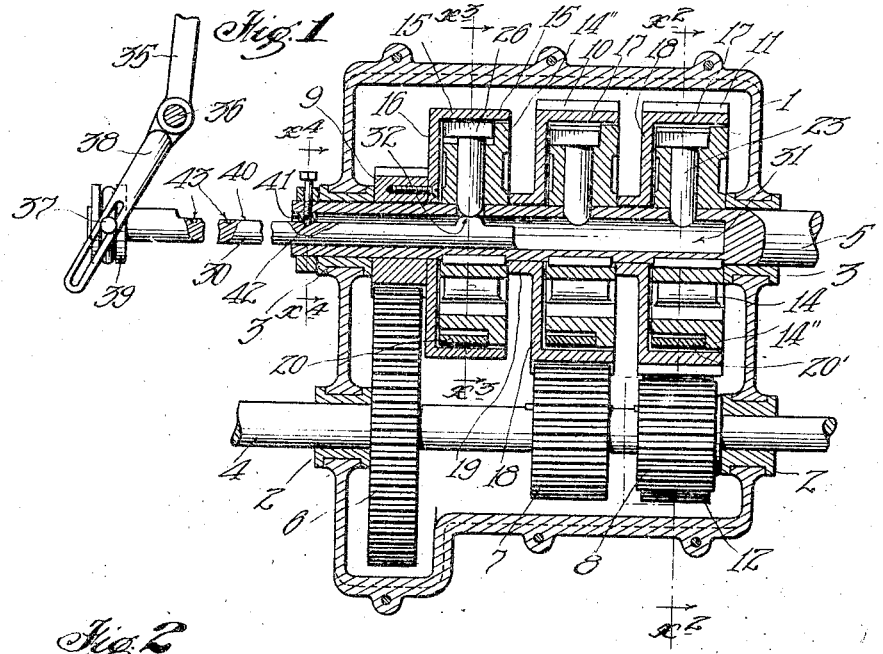
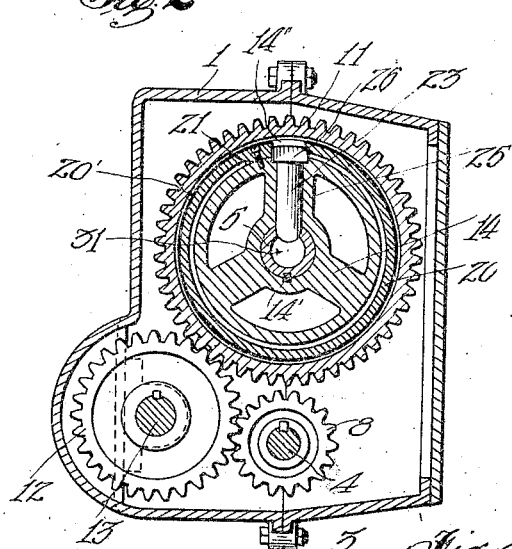
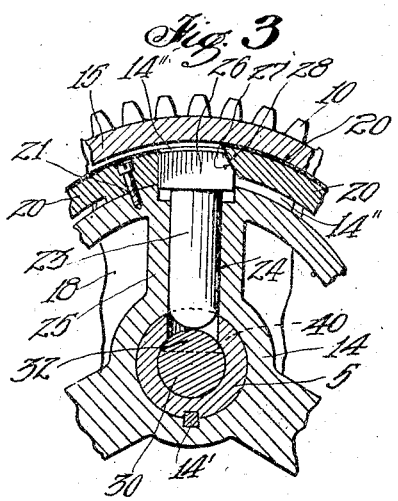
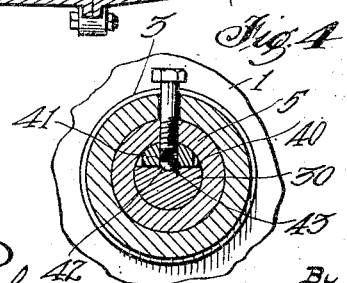
Witnesses
F. Mansfield
Frank L. A. Graham
Inventor
Andrew Boulanger.
By Townsend, Lyon, Hackley & Knight
Attorneys

UNITED STATES PATENT OFFICE.

ANDREW BOULANGER, OF LOS ANGELES, CALIFORNIA.

POWER-TRANSMISSION DEVICE.

No. 874,563.    Specification of Letters Patent.    Patented Dec. 24, 1907.

Application filed March 26, 1906. Serial No. 307,984.

*To all whom it may concern:*

Be it known that I, ANDREW BOULANGER, a citizen of the United States, residing at Los Angeles, in the county of Los Angeles and State of California, have invented a new and useful Improvement in Power-Transmission Devices, of which the following is a specification.

The invention relates to the class of devices wherein power transmission gearing is provided for variable and reverse speed which will operate for change of speed or direction while the gears are continually retained in mesh so that the noise, friction and liability of breakage resulting from throwing the gears into and out of mesh is avoided.

The main object of the present invention is to provide a power transmission device of this character which will be of extreme simplicity in construction and efficient in operation.

The accompanying drawings illustrate the invention.

Figure 1 is a longitudinal section of the device. Fig. 2 is a vertical section on the line $x^2$—$x^2$ in Fig. 1. Fig. 3 is a partial section on the line $x^3$—$x^3$ in Fig. 1. Fig. 4 is a section on line $x^4$—$x^4$ Fig. 1.

1 designates an inclosing and supporting casing formed with bearings 2, 3 for the driving shaft 4 and the driven shaft 5 respectively. The driving shaft carries a plurality of gear wheels, three being herein shown, 6, 7 and 8, of different size, the said gear wheels being fixed to said driving shaft so as to rotate therewith. The driven shaft carries a plurality of gears 9, 10, 11, which are mounted to rotate freely thereon. The gear 6 meshes with the gear 9, the gear 7 with the gear 10, and the gear 8 meshes with an intermediate gear 12 which meshes with the driven gear 11, said gear 12 being journaled on a stud 13 in casing 1.

Each driven gear 9, 10, 11 is provided with a clutch comprising a rotary member or spider 14 fastened to the driven shaft by a key 14' and extending within a ring or friction drum connected to the corresponding gear 9, 10 or 11. This friction ring in the case of the gear 9 is constituted by a circular flange 15 on a disk or wheel 16 projecting from and connected to the driven gear 9. In case of the driven gears 10 and 11 this friction ring is constituted by the rims 17 of gear wheels 10 and 11 which are connected by webs 18 to hubs 19 journaled on the shaft 5. An elastic clutch member 20 in the form of a nearly complete ring extends within the friction ring 15, or 17, as the case may be, and normally is of slightly less external diameter than said ring so as to rest freely within the ring. One end of this friction member is fastened at 21 to the rotary clutch member 14, the other member being free and having a beveled end portion. Each clutch member or spider 14 has an outwardly extending flange 14'' at one side of the clutch member 20 so as to substantially close the space between members 14 and 15 or 14 and 17.

A slide or actuating member 23 is mounted to slide radially in radial bore 24 in one of the arms 25 of the spider 14, this slide having a head 26 at its outer end provided with a beveled or incline portion 27 engaging the inclined end or face 28 of the clutch ring 20 to expand said ring when the slide 23 moves outwardly. Such outward movement of the slide is effected by an operating bar 30 sliding in an axial bore 31 in the driven shaft 5 and mounted to rotate therewith, said bar having a hump or incline projection 32 engaging with the rounded inner end of the member 23 to push the same outwardly as the hump passes under said inner end, the return or inward movement of the member 23 being effected by the clutch ring 20 acting on the corresponding inclined face of the actuating member 23. This longitudinal movement of the bar 30 may be obtained in any suitable manner, for example, by a suitable means such as a lever pivoted at 36 and connected at 37 with a yoke 38 engaging in a neck 39 on the bar 30, so that in any rotative position of said bar and the shaft 5, the said bar may be moved longitudinally by the operation of the lever 35. The bar 30 is a cylindrical bar, with portion 40 flatted, the unflatted portion forming the projection 32, a plug or block 41 being fixed in the bar or shaft 5 to engage the flat portion 40, holding the bar 30 in proper angular position. A spring catch 42 engages in notches 43 in the flat portion 40 to lock the bar in any of the operative positions. Clutch ring 20 has a facing 20' of suitable friction material such as leather.

The operation is as follows:—The driving shaft 4 is assumed to be connected to a suitable motor or driving power not shown, and the driven shaft 4 is connected to the shaft, wheel or element to be driven, for example, an automobile axle. When the power is to be thrown off, or the driven element is at rest, the operating bar 30 is in a position in which it is out of contact with any one of the actuating members 23 so that all of said members are retracted and the clutch members 20 are sprung in so as to be free of contact with the external rim members 15, 17, as shown in Fig. 2. When operation at low speed is desired, the operating rod 30 is moved to bring the incline portion 32 thereon into contact with the actuating member 23 for the clutch 14 of the low speed gear 10, thereby forcing said actuating member outwardly, distending the clutch ring 20 and causing the latter to bind and grip within the friction ring 17, thereby clutching the gear 10 to the said member 14 and to the shaft 5 rotating therewith. As the gear 10 is always in rotation by virtue of its engagement with the driving gear 7 the operation above described will cause the driven shaft 5 to be set in rotation at a speed dependent on the relative pitch diameters of the respective gears 7 and 10. If, however, a speed somewhat lower than this is desired, it may be obtained by moving the operating rod 30 so as to effect only a partial protrusion of the actuating member 23 with the result that there will be more or less slippage in the clutch connection and the shaft 5 will not be driven at the full speed corresponding to the ratio of the gearing, and this rotary or slipping effect may be accentuated by the application of a brake to the driven shaft 5. When it is desired to drive the vehicle at a high speed, the operating member 30 is moved to bring its cam projection 31 into engagement with the actuating member 23 for the clutch device corresponding to the high speed gear 9, thereby spreading the clutch ring 20 of said device into engagement with the ring 15 and setting or engaging the clutch as shown in Fig. 3 for driving the shaft 5 at high speed. This speed may also be moderated by regulation of the clutch as described for low speed. If desired to reverse the speed, the operating bar 30 is moved in the opposite direction so as to bring the hump thereon into engagement with the actuating member 23 for the reverse gear 11, thereby clutching said gear to the shaft 5, and as by the action of said gear by the driving gear 8 through the intermediate gear 12 the said gear 11 revolves in opposite direction to the gears 9, 10, it follows that the shaft 5 will in this case rotate in the reverse direction. In each working position the parts will be held by the locking devices 42, 43.

It will be noted that the described construction provides for complete regulation, the number of gears being made sufficient in any case for the number of speeds desired, and the device is also of extreme compactness and simplicity.

What I claim is:—

A power transmission means comprising a driving shaft, a plurality of gears carried thereby, a driven shaft, a plurality of gears rotatably mounted on the driven shaft and continually in driven connection with the driving gears, clutch drums connected to the respective driven gears and having rims with internal friction faces, clutch members mounted on and connected to rotate with the driven shaft and extending within the faces of the aforesaid drums, each clutch being provided with an elastic device in the form of a nearly complete ring, one end of which is fastened to the inner clutch member, the said ring extending within the annular drum rim and having an inclined end, an actuating member in each clutch moving radially and provided with an inclined portion for engaging the inclined end of the clutch ring to distend said ring, and an operating bar axially movable in the driven shaft and provided with an inclined portion to engage the said actuating member of each clutch, said operating bar being cylindrical and having flatted portions on each side of its inclined portion, said bar having notches in its flatted portion and a spring actuated device having a projection for engaging in said notches.

In testimony whereof, I have hereunto set my hand at Los Angeles, California, this 14th day of March 1906.

ANDREW BOULANGER.

In presence of—
ARTHUR P. KNIGHT,
BELL HALL.